US012531948B2

(12) United States Patent
Chavez (10) Patent No.: US 12,531,948 B2
(45) Date of Patent: Jan. 20, 2026

(54) CONTACT CENTER EVOLUTION MODEL (71) Applicant: Avaya Management L.P., Durham, NC (US)

(72) Inventor: David Chavez, Broomfield, CO (US)

(73) Assignee: Avaya Management L.P., Durham, NC (US)

( * ) Notice: Subject to any disclaimer, the term of this patent is extended or adjusted under 35 U.S.C. 154(b) by 520 days.

(21) Appl. No.: 17/731,113

(22) Filed: Apr. 27, 2022

(65) Prior Publication Data

US 2023/0353676 A1 Nov. 2, 2023

(51) Int. Cl.
*H04M 3/00* (2024.01)
*H04M 3/51* (2006.01)
*H04M 3/523* (2006.01)

(52) U.S. Cl.
CPC ....... *H04M 3/5237* (2013.01); *H04M 3/5175* (2013.01); *H04M 2203/408* (2013.01); *H04M 2203/551* (2013.01)

(58) Field of Classification Search
CPC .......................... H04M 3/5237; H04M 3/5175
See application file for complete search history.

(56) References Cited

U.S. PATENT DOCUMENTS

| 8,634,543 | B2 | 1/2014 | Flockhart et al. |
| 8,964,958 | B2 | 2/2015 | Steiner |
| 9,742,916 | B1 | 8/2017 | Keian |
| 10,270,909 | B2 | 4/2019 | Wolf |
| 10,693,922 | B2 | 6/2020 | Linder |
| 10,868,915 | B2 | 12/2020 | Buehler et al. |
| 2010/0235218 | A1 | 9/2010 | Erhart et al. |
| 2011/0125793 | A1 | 5/2011 | Erhart et al. |
| 2011/0125826 | A1 | 5/2011 | Erhart et al. |
| 2017/0064082 | A1* | 3/2017 | Matula ................ H04M 3/5238 |

* cited by examiner

*Primary Examiner* — Rasha S Al Aubaidi
(74) *Attorney, Agent, or Firm* — Sheridan Ross P.C.

(57) ABSTRACT

Customers of a contact center are subject to a high level of processing in order to best match the customer's needs with an agent qualified to address those needs. However, such processing is often unwarranted, such as when the customer wishes to speak with their personal agent. When a customer is willing to forgo quickly being connected to the next available agent in favor of waiting to be connected with their designated personal agent, even if such a connection occurs at a later time, demands on processing and network resources is decreased. The customer, such as in a second communication, is connected with their personal agent to address the customer's needs.

20 Claims, 5 Drawing Sheets

CONTACT CENTER EVOLUTION MODEL

FIELD OF THE DISCLOSURE

The invention relates generally to systems and methods for routing a communication and particularly to triggering a subsequent communication with a first communication.

BACKGROUND

Contact centers have evolved into addressing customer work items by way of text messages, online chats, social media interactions, emails, video calls, automated kiosks, and other forms of communication, as well as telephone calls. Quickly connecting a customer to a selected agent when utilizing a real-time communication (e.g., voice call) is one priority of many contact centers. Another priority is to ensure that the selected agent has the particular skill set required to successfully resolve the work item.

In other forms of communication, such as text messages and emails, customers tend to have a greater tolerance for delays compared to voice calls. As a benefit, contact centers have more time to be flexible when selecting a particular agent, such as one having a greater degree of skill in a particular attribute determined to be relevant for resolving the work item being addressed in the communication.

Contact centers expend significant computational resources determining the most optimal method for routing. For example, a customer that telephoned the contact center may be on hold waiting to be connected to an agent and the associated work item is known to require the selected agent having a particular skill or number of skills, such as a particular technical skill and a fluency in a particular language. Such ideal agent may not exist or may exist but is currently engaged in other tasks. Accordingly, the contact center weighs the benefits of connecting the customer to an agent with less than all of the desired skills, even if the resulting interaction between the customer and agent takes longer or is less likely to successfully resolve the work item, versus the time the customer is waiting on hold to be connected with the ideal agent. Additionally, an agent that has less than all of the required degrees of skill, may be highly skilled in a different area that is desired to address other work items associated with other customers. If that particular agent is then connected to one customer, then other customers requiring such agent's skills are then forced to hold or be routed to another agent; other agents that may similarly be more skilled in other areas. These are some of the factors considered by contact centers while striving to quickly connect customers to agents who can resolve the associated work item.

SUMMARY

Waiting on-hold during a real-time communication is well-known to be undesirable and excessive wait times negatively impact customers' impression of the agent and the enterprise they serve. It also increases the burden on networking and computing resources to maintain a call that is placed on hold, which could be utilized for other purposes, or to have resources allocated to receive and maintain the call only to have the customer abandon the call, often to repeat the process at a later time. Striving to cutdown wait times is often a top priority for contact centers. Even for non-real time communications, speed in connecting the customer to an agent still remains important. However, the customer's priorities may be different. In particular, the customer may highly value being connected to a particular agent, such as an agent they have interacted with in the past or otherwise established a rapport with. In many situations a customer may prefer to wait for a personally preferred agent (herein, "personal agent") rather than being quickly connected to the next available agent.

These and other needs are addressed by the various embodiments and configurations of the present invention. The present invention can provide a number of advantages depending on the particular configuration. These and other advantages will be apparent from the disclosure of the invention(s) contained herein.

In one embodiment, the computational and networking resources required to perform a routing determination may be substantially or even entirely omitted if a customer is known to have a personal agent and speed in connecting the customer to the agent, even if not entirely discounted, is less important. Additionally or alternatively, the customer may not specify a particular agent, such as by name, but the customer and/or the associated work item is known to be best addressed by a particular individual that may be an agent or may be serving in a different role within the enterprise. For example, sales staff in a physical store that may be idle and have the skills required to address a particular work item. In another example, a customer's work item may be addressed by other individuals but the customer is designated for special handling (e.g., VIP) and routed to a more senior person or even the chief executive officer.

The prior art currently has various tools to provide automated agents ("bots") to address many of the work items a contact center incorporates. Bots or other automated agents (e.g., interactive voice response (IVR)) may be initially utilized to gather additional information used for determining the particular skills that are likely required to assess and resolve the work item.

In another embodiment, a customer may be known to have, or determined to have, a personal agent they prefer to interact with. If the agent is available, the customer is connected to their personal agent. If their personal agent is not currently available, then the customer may be given the opportunity to wait on-hold, receive a call-back once their personal agent is available, or be connected to the next available agent. If the agent elects to be connected to the next available agent, at the end of the interaction, the customer is asked if they wish to update their personal agent to the agent they just interacted with or keep it as is.

In another embodiment, the amount of time a customer is waiting for a call-back from their personal agent may be monitored and, if it exceeds a previously defined threshold, an outbound contact to the customer is initiated. The outbound contact may include the option to continue to wait for their personal agent or be connected to another agent. If they elect to be connected to another agent, the communication may be joined or transferred to the personal agent if the personal agent becomes available before the work item is concluded. Additionally or alternatively, at the conclusion of the communication, the customer is provided with the opportunity to designate the other agent as their personal agent, add the other agent as an alternative or additional personal agent, or leave their designated personal agent unchanged.

In another embodiment, outbound communications may be restricted to only include the personal agents for those customers that have personal agents.

When a customer does not have a personal agent, the contact center may utilize other customer and/or work item attributes to route the customer to a particular agent to address their work item.

Exemplary aspects are directed to:

A system for routing a communication, comprising:
a network interface to a network;
a processor; and
wherein the processor performs:
    receiving, via the network, a plurality of communications to be routed to a plurality of agent devices, each agent device being utilized by a corresponding agent;
    collecting primary routing information for each of the plurality of communications;
    upon determining that the primary routing information for a first communication of the plurality of communications comprises a first personal agent for a customer corresponding to the first communication, determining a first availability of the first personal agent to be connected to the first communication;
    upon determining the first availability is greater than a first threshold, collecting secondary routing information comprising indicia to disconnect from the first communication and conduct a second communication at a subsequent time; and
    disconnecting from the first communication and, at the subsequent time, connecting the first personal agent device and a customer device as nodes on the network to conduct the second communication via the network.

A method for routing a communication, comprising:
receiving, via a network, a plurality of communications to be routed to a plurality of agent devices, each agent device being utilized by a corresponding agent;
collecting primary routing information for each of the plurality of communications;
upon determining that the primary routing information for a first communication of the plurality of communications comprises a first personal agent for a customer corresponding to the first communication, determining a first availability of the first personal agent to be connected to the first communication;
upon determining the first availability is greater than a first threshold, collecting secondary routing information comprising indicia to disconnect from the first communication and conduct a second communication at a subsequent time; and
disconnecting from the first communication and, at the subsequent time, connecting the first personal agent device and a customer device as nodes on the network to conduct the second communication via the network.

A system, comprising:
means to receive a plurality of communications to be routed to a plurality of agent devices, each agent device being utilized by a corresponding agent;
means to collect primary routing information for each of the plurality of communications;
means to, upon determining that the primary routing information for a first communication of the plurality of communications comprises a first personal agent for a customer corresponding to the first communication, determine a first availability of the first personal agent to be connected to the first communication;
means to, upon determining the first availability is greater than a first threshold, collect secondary routing information comprising indicia to disconnect from the first communication and conduct a second communication at a subsequent time; and
means to disconnect from the first communication and, at the subsequent time, connect the first personal agent device and a customer device as nodes on the network to conduct the second communication via the network.

Any of the above aspects:
Wherein the processor further performs concurrently maintaining the first communication with the customer device while continually determining whether the first availability is greater than the first threshold;
Wherein the processor further performs:
    maintaining the first communication until a decision point; and
    at the occurrence of the decision point, making a final determination whether the first availability is greater than the first threshold.
Wherein the processor further performs:
at the occurrence of the decision point and upon the first availability not being greater than the first threshold, enqueuing the first communication in a queue to connect to the first personal agent device upon the first communication reaching the head of the queue.
Wherein the processor further performs:
    collecting the secondary routing information further comprising an address of the customer device on the network different from an address of a device utilized during the first communication; and
    connecting the first personal agent device with the customer device utilizing the address.
Further comprising:
    a data storage; and
    wherein the primary routing information comprises the first personal agent maintained in a record in the data storage and having a value set during a previous communication between the customer and a previous agent wherein the customer designated the previous agent as the first personal agent.
Wherein the processer further performs:
    upon determining the first availability is greater than the first threshold, collecting secondary routing information comprising a second personal agent for the customer and:
    upon determining a second availability of the second personal agent to be connected to the first communication is not greater than a second threshold, connecting a second personal agent device utilized by the second personal agent to the customer device as nodes on the network to conduct the first communication; and
    upon determining the second availability is greater than the second threshold, disconnecting from the first communication and, at the subsequent time, connecting the first personal agent device and the customer device as nodes on the network to conduct the second communication.
Wherein the processor further performs:
    upon determining the first availability is greater than the first threshold, collecting secondary routing information comprising a second personal agent for the customer and:
    upon determining a second availability of the second personal agent to be connected to the first communication is not greater than a second threshold, connecting a second personal agent device utilized by the second personal agent to the customer device as nodes on the network to conduct the first communication; and upon determining the second availability is greater than the second threshold, disconnecting from the first communication and, at the subsequent time, connecting the second personal agent device and the customer device as nodes on the network to conduct the second communication.

Wherein the first personal agent comprises an identifying attribute of one of a number of agents.

Further comprising maintaining the first communication with the customer device while continually determining whether the first availability is greater than the first threshold.

Further comprising:
maintaining the first communication until a decision point; and
at the occurrence of the decision point, making a final determination whether the first availability is greater than the first threshold.

Further comprising:
at the occurrence of the decision point and upon the first availability not being greater than the first threshold, enqueuing the first communication in a queue to connect to the first personal agent device upon the first communication reaching the head of the queue.

Further comprising:
collecting the secondary routing information further comprising an address of the customer device on the network different from an address of a device utilized during the first communication; and
connecting the first personal agent device with the customer device utilizing the address.

Wherein the primary routing information comprises the first personal agent maintained in a record in a data storage and having a value set during a previous communication between the customer and a previous agent wherein the customer designated the previous agent as the first personal agent.

Further comprising:
upon determining the first availability is greater than the first threshold, collecting secondary routing information comprising a second personal agent for the customer and:
upon determining a second availability of the second personal agent to be connected to the first communication is not greater than a second threshold, connecting a second personal agent device utilized by the second personal agent to the customer device as nodes on the network to conduct the first communication; and
upon determining the second availability is greater than the second threshold, disconnecting from the first communication and, at the subsequent time, connecting the first personal agent device and the customer device as nodes on the network to conduct the second communication.

Further comprising:
upon determining the first availability is greater than the first threshold, collecting secondary routing information comprising a second personal agent for the customer and:
upon determining a second availability of the second personal agent to be connected to the first communication is not greater than a second threshold, connecting a second personal agent device utilized by the second personal agent to the customer device as nodes on the network to conduct the first communication; and
upon determining the second availability is greater than the second threshold, disconnecting from the first communication and, at the subsequent time, connecting the second personal agent device and the customer device as nodes on the network to conduct the second communication.

Wherein the first personal agent comprises an identifying attribute of one of a number of agents.

Further comprising:
means to collect the secondary routing information further comprising an address of the customer device on the network different from an address of a device utilized during the first communication; and
means to connect the first personal agent device with the customer device utilizing the address.

A system on a chip (SoC) including any one or more of the above aspects.

One or more means for performing any one or more of the above aspects.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
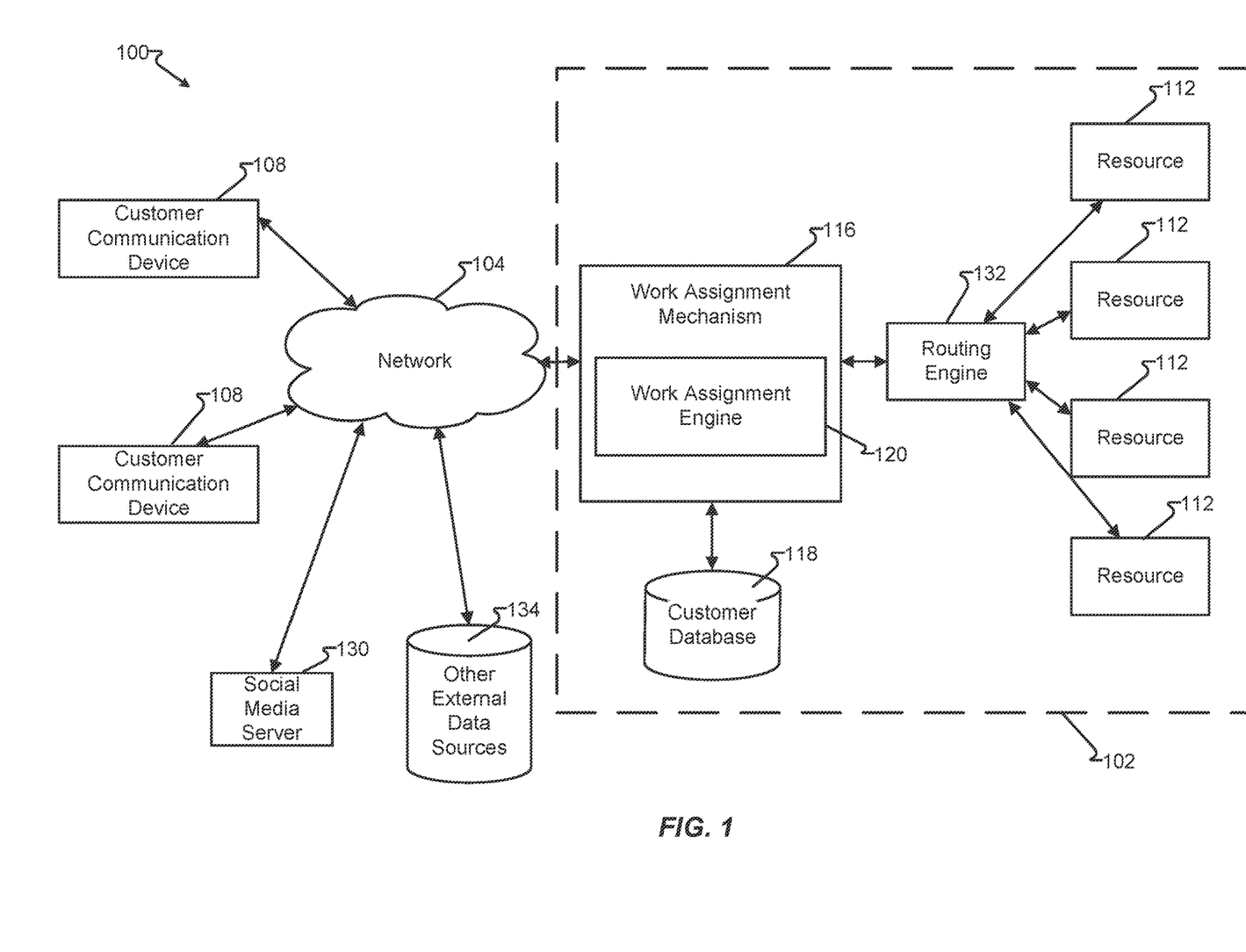
FIG. 1 depicts a system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 are distributed to handle incoming work items (in the form of contacts) from customer communication devices 108.

Contact center 102 is variously embodied to receive and/or send messages associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media, and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VOIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication device(s) 108 may correspond to a particular customer(s). In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received via communication network 104 at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
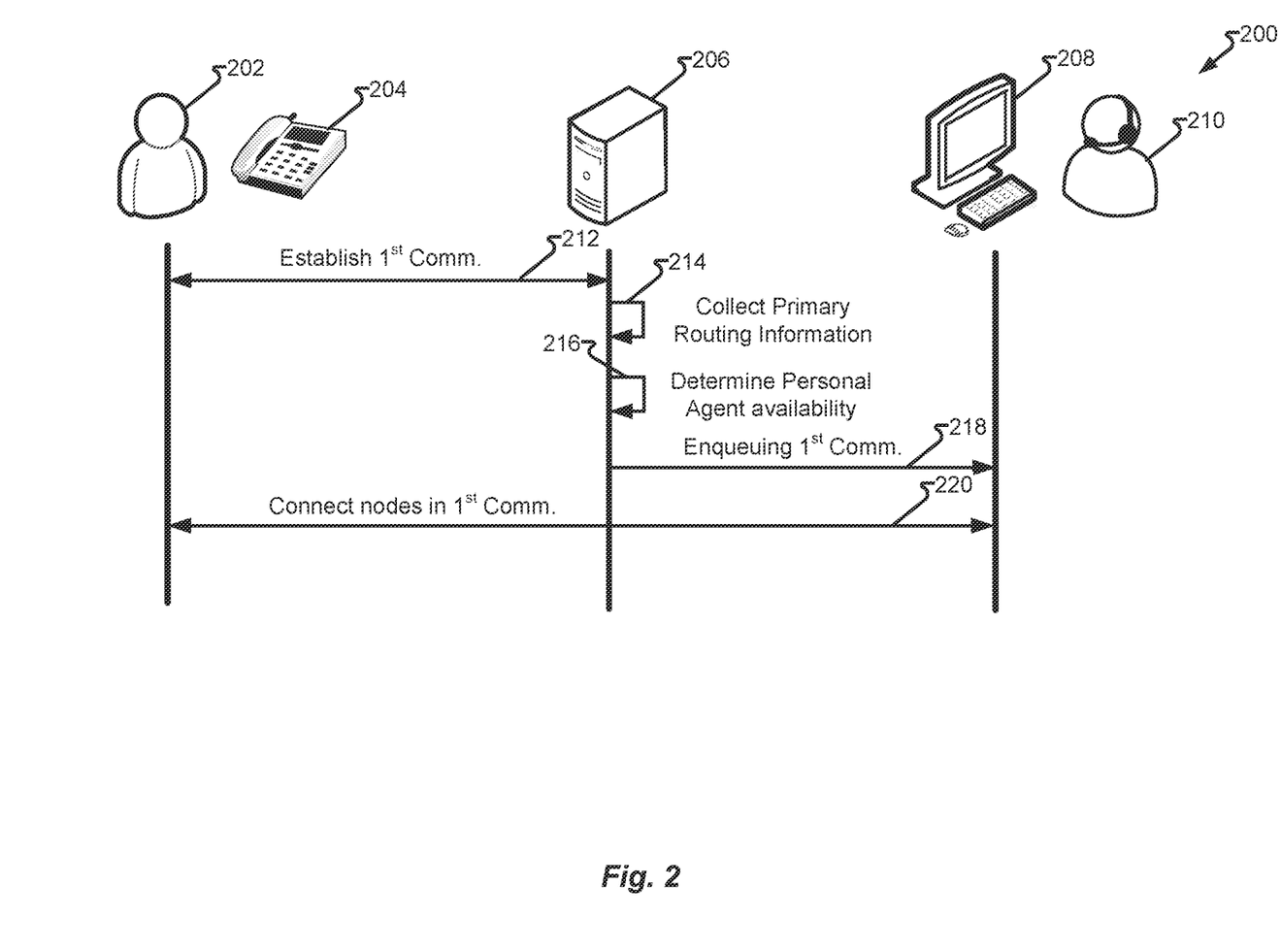
FIG. 2 depicts an interaction in accordance with embodiments of the present disclosure.

FIG. 2 depicts interaction 200 in accordance with embodiments of the present disclosure. Personal agent device 208 and personal agent 210, in combination, are embodied as a resource 112 when embodied as a human agent communicating with customer 202 via network 104 via personal agent device 208. Customer 202 utilizes customer device 204, which is an embodiment of customer communication device 108, for communicating over network 104 (see FIG. 1).

Customer 202, utilizing customer device 204 connects to server 206 in step 212 to establish the first communication. In one embodiment, server 206 is embodied as one of resource 112 when embodied as an automated resource, such as an IVR, chat bot, etc. Step 214 collects primary routing information, which may comprise determining a subject of the associated work item. Step 214 may be performed solely by automated resources, such as server 206 alone and/or via accessing data in a data storage (e.g., social media server 130, other external data sources 134, customer database 118, etc.). For example, the identity of customer 202 known from the data storage and call header information (e.g., caller ID), address on a Simple Messaging System (SMS) network, email "sender" header, etc. and, via the data storage, determine a subject matter of the work item, such as a particular product that customer 202 is known to have purchased. It should be appreciated that step 214 may query customer device 204 and, via inputs from customer 202, receive a response to the queries. Queries may include gathering preliminary information (e.g., reason for the communication, identity of customer 202, account number, order number, and/or other data as may be required or helpful to route the first communication to the appropriate agent (e.g., one of a number of resources 112).

Step 214 also determines, such as via a query of customer database 118, that customer 202 has a personal agent identified and, if so, step 216 determines the availability of the personal agent, such as personal agent 210. If the availability is below a previously determined threshold, step 220 connects customer device 204 with personal agent device 208 via network 104 to engage in the first communication. The value of the threshold may be determined by a system setting and/or preference provided by customer 202 in a prior or current communication. For example, step 214 may query customer 202 as to how long they are willing to wait to speak with personal agent 210 (assuming a voice call) and, if the value provided will not be exceeded, the call is then connected to personal agent device 208 or enqueued in a queue of calls (again, assuming voice calls) which is determined to reach the head of the queue before the threshold.

While communications may be generally considered to be voice calls or other real-time communications, in other embodiments, the communication may be text, email, social media chat, and/or another form of communication that may further comprise real-time or non-real time communications. For example, customer 202 may be willing to wait on hold for a voice call with personal agent 210 for ten minutes, willing to wait an hour for text-based interaction with personal agent 210, and willing to wait two days for an email exchange with personal agent 210, before attempting to seek other means for resolution of the work item sought to be addressed in the communication.

Figure 3:
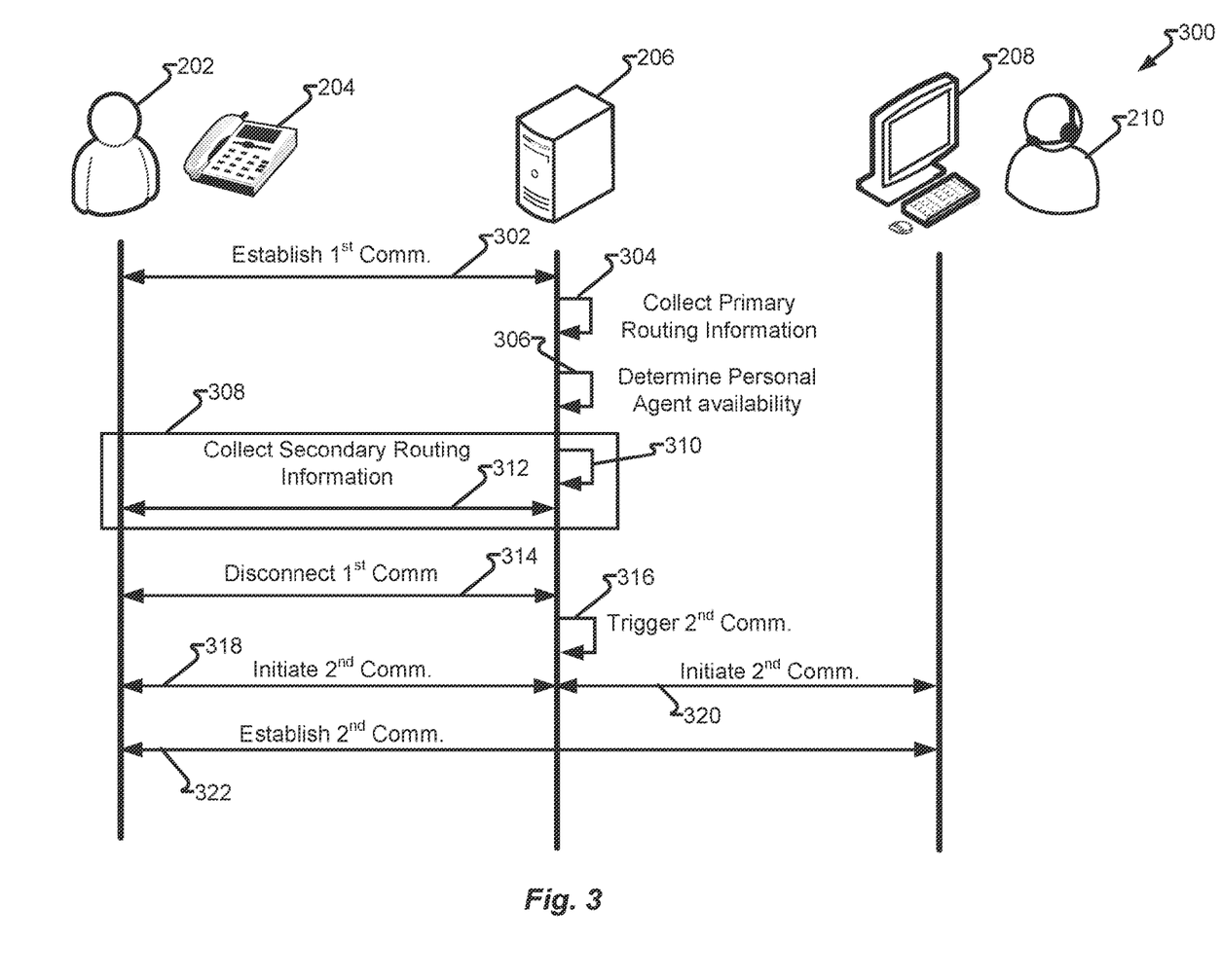
FIG. 3 depicts an interaction in accordance with embodiments of the present disclosure.

FIG. 3 depicts interaction 300 in accordance with embodiments of the present disclosure. Generally, interaction 200 (see FIG. 2) is implemented when personal agent 210 is available, or available before the occurrence of a previously determined threshold of time, for a communication with customer 202. Interaction 300 is generally implemented when personal agent 210 is not available, or not available within the previously determined threshold of time, to be connected to customer 202.

In one embodiment, customer 202 connects in a first communication to server 206 in step 302. Step 304 collects preliminary routing information (e.g., subject matter, existence of a designated personal agent for customer 202) and step 306 determines the availability of personal agent 210. If step 306 determines that personal agent 210 is not available to accept the current communication with customer 202, and will not become available before a previously determined threshold, then subprocess 308 collects secondary routing information. Secondary routing information may include step 310 wherein server 206, alone or via access to other data sources (e.g., social media server 130, other external data sources 134, customer database 118, etc.), collects additional information. The secondary routing information may include determining if a secondary (e.g., alternate or backup) personal agent has been designated for customer 202 and/or the existence of other resources that may be capable of resolving the work item associated with the communication. For example, personal agent 210 may be an airline ticketing agent and, based on information gathered in step 304, server 206 may determine that resolution of the work item may be possible upon connecting customer 202 with a counter agent in the Denver airport that is currently, or will soon (prior to the threshold) become, available to accept the communication.

Step 312 may gather secondary information from customer 202 and/or present options to customer 202 for selection. For example, customer 202 may be asked whether they wish to wait for personal agent 210, which may be a substantial wait; disconnect and receive a call-back from personal agent 210 when available or at a designated time; enqueued to connect to a previously designated secondary personal agent; or be immediately (or enqueued and connected before the occurrence of another threshold of time) connected to an alternative resource who may be able to resolve the work item. Customer 202, via customer device 204, may then provide a response.

If customer device 204 prefers to wait for their designated personal agent 210, then step 314 disconnects the first communication. Step 316 triggers the initiation of a second communication. Step 316 may be the occurrence of a previously arranged time and/or having indicia of the second communication, enqueued in a queue of communications utilized by personal agent 210 and personal agent device 208, reach the head of the queue holding communications for personal agent 210. Then, steps 318 and 320 are performed to cause customer device 204 to be connected via network 104 with personal agent device 208 and thereby establishes a second communication in step 322.

Figure 4:
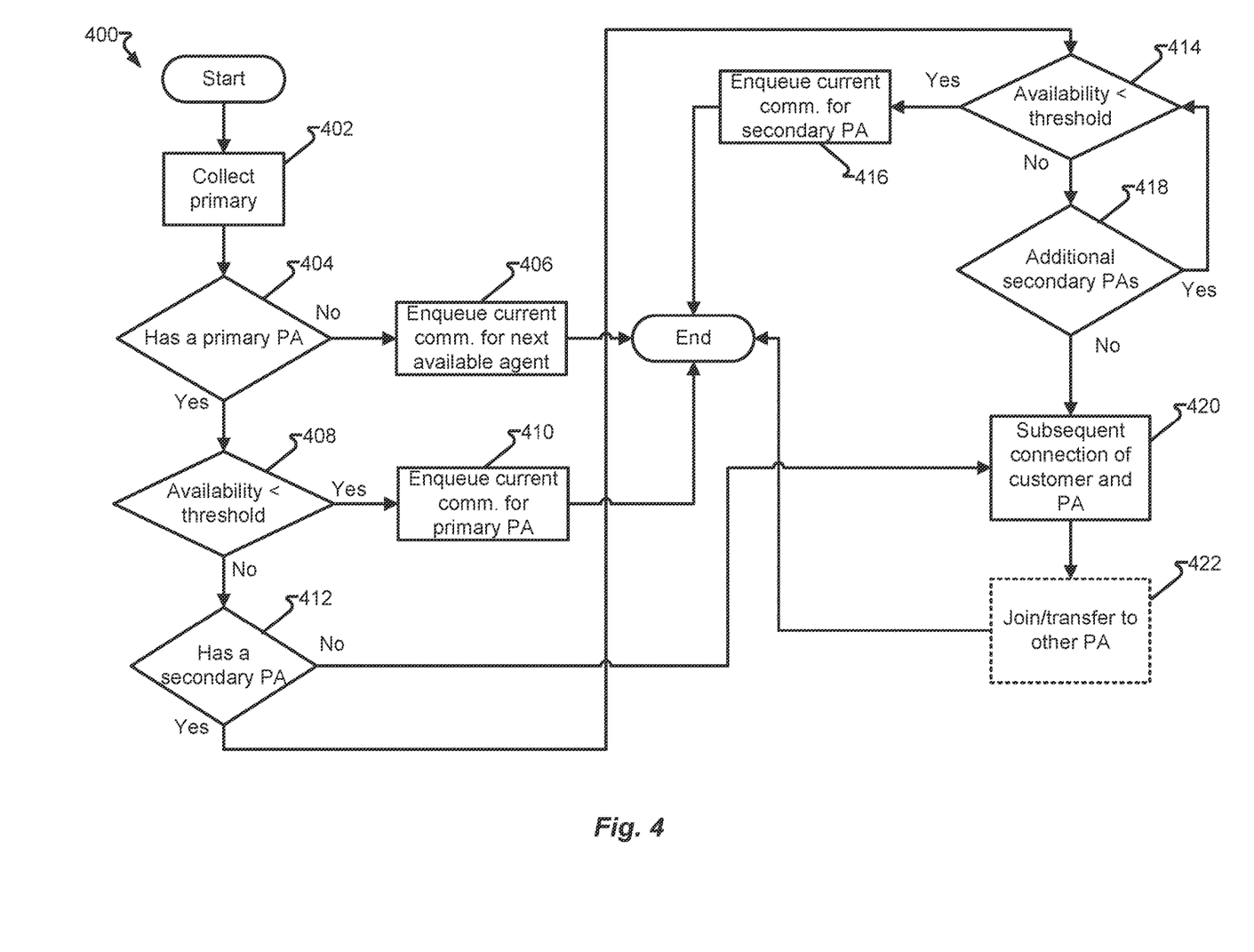
FIG. 4 depicts a process in accordance with embodiments of the present disclosure.

FIG. 4 depicts process 400 in accordance with embodiments of the present disclosure. In one embodiment, process 400 is embodied as machine-readable instructions maintained in a non-transitory storage that, when read by a machine, such as at least one processor of server 206, cause the machine to execute the machine-readable instructions.

Process 400 begins, such as upon receiving a first communication from a communication device (e.g., customer device 204) and, in step 402, primary routing information is accessed. For example, server 206 may access rules, data records, agent availability statuses, etc. Test 404 determines if the customer associated with the communication (e.g., customer 202) is associated with a primary personal agent (or "primary PA" as illustrated), such as by accessing a record in customer database 118 and/or other data storage. If test 404 is determined in the negative, then step 406 enqueues the communication to be connected to the next available agent, each being one resource 112 and process 400 ends.

If test 404 is determined in the affirmative, test 408 then determines the availability of the primary personal agent and whether the availability is less than a threshold amount. If test 408 is determined in the affirmative, step 410 enqueues the communication to be connected to the primary personal agent and, once reaching the head of the queue, is automatically connected with the primary personal agent. Process 400 may then end.

If test 408 is determined in the negative, test 412 determines if the customer associated with the communication (e.g., customer 202) is associated with a secondary personal agent (or "secondary PA" as illustrated), such as by accessing a record in customer database 118 and/or other data storage. If test 412 is determined in the negative, processing continues to step 420 to wait for a subsequent connection with the primary PA. If test 412 is determined in the affirmative, processing continues to test 414 wherein the availability of the secondary personal agent is compared to a threshold, which may be the same or different from the threshold utilized in step 408. For example, customer 202 may be willing to wait fifteen minutes on-hold to connect to their primary person agent (e.g., personal agent 210), but if the primary personal agent will not be available for thirty minutes, they may indicate a willingness to wait on-hold for five minutes to be connected with their secondary personal agent. If test 414 is determined in the affirmative, step 416 enqueues the communication to be connected to the secondary personal agent and, once reaching the head of the queue, is automatically connected with the secondary personal agent. Process 400 may then end.

If test 414 is determined in the negative, process 400 continues to test 418 to determine if any additional secondary personal agents are associated with the customer and, if yes, processing loops back to test 414. While a personal agent may be identified personally (e.g., name, employee number, etc.), in another embodiment, a personal agent may be identified by an attribute (e.g., any one of the counter agents in the San Diego airport, a senior vice president, CEO, etc.). If test 418 is determined in the negative, processing continues to step 420 wherein the first communication is terminated and, at a subsequent time, the customer is connected to at least one personal agent in a second communication. It should be appreciated that, in another embodiment, throughout process 400 the customer may be given the opportunity to join the queue for the next available agent and exit process 400 at any time. Similarly, and in yet another embodiment, the customer may be presented with, and override, any routing decision. For example, the customer may reuse all opportunities to connect to any secondary personal agent and jump to step 420 to be subsequently connected to their primary personal agent.

In another embodiment, once connected with one agent, such as one of the secondary personal agents, another agent may become available, such as the primary personal agent or another secondary personal agent. Step 422 may automatically connect or transfer the newly available agent to the second communication.

In another embodiment, one or more steps/tests of process 400 may be determined continually. For example, the availability of one or more agents, such as personal agent 210 and/or one or more secondary personal agents, may change continually. For example, a primary personal agent may have been determined to only become available after the passage of a first threshold (i.e., the threshold utilized in step 404). However, another agent (another resource 112) may have begun their work shift with contact center 102 causing a rebalancing of work queues and, in the process, personal agent 210 is now determined to be available within the first threshold. As a consequence, prior to a decision point, such as the point wherein the first communication is disconnected as a portion of step 420, process 400 may jump to step 406. Otherwise, if the decision point is reached and the primary personal agent (or at least one secondary agent) remains unavailable before the occurrence of the respective threshold, then process 400 may continue as illustrated wherein the first communication is discontinued and a second communication initiated at a subsequent time.

Figure 5:
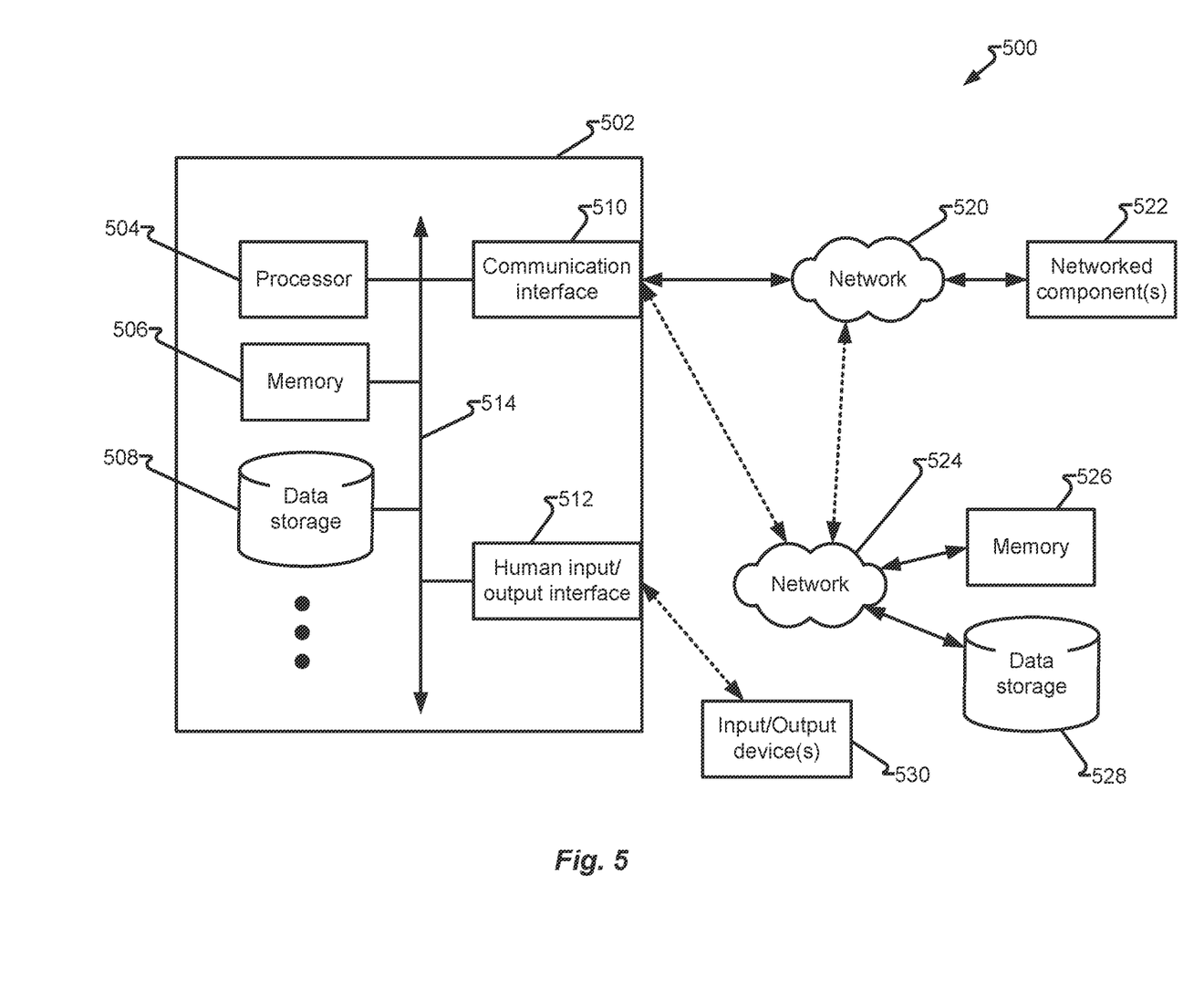
FIG. 5 depicts a system in accordance with embodiments of the present disclosure.

FIG. 5 depicts device 502 in system 500 in accordance with embodiments of the present disclosure. In one embodiment, server 206 may be embodied, in whole or in part, as device 502 comprising various components and connections to other components and/or systems. The components are variously embodied and may comprise processor 504. The term "processor," as used herein, refers exclusively to electronic hardware components comprising electrical circuitry with connections (e.g., pin-outs) to convey encoded electrical signals to and from the electrical circuitry. Processor 504 may comprise programmable logic functionality, such as determined, at least in part, from accessing machine-readable instructions maintained in a non-transitory data storage, which may be embodied as circuitry, on-chip read-only memory, memory 506, data storage 508, etc., that cause the processor 504 to perform the steps of the instructions. Processor 504 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 514, executes instructions, and outputs data, again such as via bus 514. In other embodiments, processor 504 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 504 is a non-transitory computing device (e.g., electronic machine comprising circuitry and connections to communicate with other components and devices). Processor 504 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 504). Processor 504 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 504, device 502 may utilize memory 506 and/or data storage 508 for the storage of accessible data, such as instructions, values, etc. Communication interface 510 facilitates communication with components, such as processor 504 via bus 514 with components not accessible via bus 514. Communication interface 510 may be embodied as a network port, card, cable, or other configured hardware device. Additionally or alternatively, human input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, speaker, microphone, still and/or video camera, etc. In another embodiment, communication interface 510 may comprise, or be comprised by, human input/output interface 512. Communication interface 510 may be configured to communicate directly with a networked component or configured to utilize one or more networks, such as network 520 and/or network 524.

Network 104 may be embodied, in whole or in part, as network 520. Network 520 may be a wired network (e.g., Ethernet), wireless (e.g., WiFi, Bluetooth, cellular, etc.) network, or combination thereof and enable device 502 to communicate with networked component(s) 522. In other embodiments, network 520 may be embodied, in whole or in part, as a telephony network (e.g., public switched telephone network (PSTN), private branch exchange (PBX), cellular telephony network, etc.)

Additionally or alternatively, one or more other networks may be utilized. For example, network 524 may represent a second network, which may facilitate communication with components utilized by device 502. For example, network 524 may be an internal network to a business entity or other organization, such as contact center 102, whereby components are trusted (or at least more so) than networked components 522, which may be connected to network 520 comprising a public network (e.g., Internet) that may not be as trusted.

Components attached to network 524 may include memory 526, data storage 528, input/output device(s) 530, and/or other components that may be accessible to processor 504. For example, memory 526 and/or data storage 528 may supplement or supplant memory 506 and/or data storage 508 entirely or for a particular task or purpose. As another example, memory 526 and/or data storage 528 may be an external data repository (e.g., server farm, array, "cloud," etc.) and enable device 502, and/or other devices, to access data thereon. Similarly, input/output device(s) 530 may be accessed by processor 504 via human input/output interface 512 and/or via communication interface 510 either directly, via network 524, via network 520 alone (not shown), or via networks 524 and 520. Each of memory 506, data storage 508, memory 526, data storage 528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 530 may be a router, a switch, a port, or other communication component such that a particular output of processor 504 enables (or disables) input/output device 530, which may be associated with network 520 and/or network 524, to allow (or disallow) communications between two or more nodes on network 520 and/or network 524. For example, a connection between one particular customer, using a particular customer communication device 108, may be enabled (or disabled) with a particular networked component 522 and/or particular resource 112. Similarly, one particular networked component 522 and/or resource 112 may be enabled (or disabled) from communicating with a particular other networked component 522 and/or resource 112, including, in certain embodiments, device 502 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® 15-4670K and i7-4770K 22 nm Haswell, Intel® Core i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for routing a communication, comprising:
   a network interface to a network;
   a processor; and
   wherein the processor performs:
   receiving, via the network, a plurality of communications to be routed to a plurality of agent devices, each agent device being utilized by a corresponding agent;
   collecting primary routing information for each of the plurality of communications;
   upon determining that the primary routing information for a first communication of the plurality of communications comprises a first personal agent for a customer corresponding to the first communication, determining a first availability of the first personal agent to be connected to the first communication;
   concurrently maintaining the first communication with the customer via a customer device while continually determining whether the first availability is greater than a first threshold;
   waiting until a decision point and, at an occurrence of the decision point, determining the first availability is greater than the first threshold, and collecting secondary routing information comprising indicia to disconnect from the first communication and conduct a second communication at a subsequent time; and
   disconnecting from the first communication and, at the subsequent time, connecting a first personal agent device and the customer device as nodes on the network to conduct the second communication via the network.

2. The system of claim 1, wherein the processor further performs:
   at the occurrence of the decision point and upon the first availability not being greater than the first threshold, enqueuing the first communication in a queue to connect to the first personal agent device upon the first communication reaching a head of the queue.

3. The system of claim 1, wherein the processor further performs:
   collecting the secondary routing information further comprising an address of the customer device on the network different from an address of a device utilized during the first communication; and
   connecting the first personal agent device with the customer device utilizing the address.

4. The system of claim 1, further comprising:
   a data storage; and
   wherein the primary routing information comprises the first personal agent maintained in a record in the data storage and having a value set during a previous communication between the customer and a previous agent wherein the customer designated the previous agent as the first personal agent.

5. The system of claim 1, wherein the processor further performs:
   upon determining the first availability is greater than the first threshold, collecting the secondary routing information comprising a second personal agent for the customer and:

upon determining a second availability of the second personal agent to be connected to the first communication is not greater than a second threshold, connecting a second personal agent device utilized by the second personal agent to the customer device as nodes on the network to conduct the first communication; and upon determining the second availability is greater than the second threshold, disconnecting from the first communication and, at the subsequent time, connecting the first personal agent device and the customer device as nodes on the network to conduct the second communication.

6. The system of claim 1, wherein the processor further performs:

upon determining the first availability is greater than the first threshold, collecting the secondary routing information comprising a second personal agent for the customer and:

upon determining a second availability of the second personal agent to be connected to the first communication is not greater than a second threshold, connecting a second personal agent device utilized by the second personal agent to the customer device as nodes on the network to conduct the first communication; and upon determining the second availability is greater than the second threshold, disconnecting from the first communication and, at the subsequent time, connecting the second personal agent device and the customer device as nodes on the network to conduct the second communication.

7. The system of claim 1, wherein the first personal agent comprises an identifying attribute of one of a number of agents.

8. A method for routing a communication, comprising:

receiving, via a network, a plurality of communications to be routed to a plurality of agent devices, each agent device being utilized by a corresponding agent;

collecting primary routing information for each of the plurality of communications;

upon determining that the primary routing information for a first communication of the plurality of communications comprises a first personal agent for a customer corresponding to the first communication, determining a first availability of the first personal agent to be connected to the first communication;

concurrently maintaining the first communication with the customer via a customer device while continually determining whether the first availability is greater than a first threshold;

waiting until a decision point and, at an occurrence of the decision point, determining the first availability is greater than the first threshold, and collecting secondary routing information comprising indicia to disconnect from the first communication and conduct a second communication at a subsequent time; and disconnecting from the first communication and, at the subsequent time, connecting a first personal agent device and the customer device as nodes on the network to conduct the second communication via the network.

9. The method of 8, further comprising:

at the occurrence of the decision point and upon the first availability not being greater than the first threshold, enqueuing the first communication in a queue to connect to the first personal agent device upon the first communication reaching a head of the queue.

10. The method of claim 8, further comprising:

collecting the secondary routing information further comprising an address of the customer device on the network different from an address of a device utilized during the first communication; and connecting the first personal agent device with the customer device utilizing the address.

11. The method of claim 8, wherein the primary routing information comprises the first personal agent maintained in a record in a data storage and having a value set during a previous communication between the customer and a previous agent wherein the customer designated the previous agent as the first personal agent.

12. The method of claim 8, further comprising:

upon determining the first availability is greater than the first threshold, collecting the secondary routing information comprising a second personal agent for the customer and:

upon determining a second availability of the second personal agent to be connected to the first communication is not greater than a second threshold, connecting a second personal agent device utilized by the second personal agent to the customer device as nodes on the network to conduct the first communication; and upon determining the second availability is greater than the second threshold, disconnecting from the first communication and, at the subsequent time, connecting the first personal agent device and the customer device as nodes on the network to conduct the second communication.

13. The method of claim 8, further comprising:

upon determining the first availability is greater than the first threshold, collecting the secondary routing information comprising a second personal agent for the customer and:

upon determining a second availability of the second personal agent to be connected to the first communication is not greater than a second threshold, connecting a second personal agent device utilized by the second personal agent to the customer device as nodes on the network to conduct the first communication; and upon determining the second availability is greater than the second threshold, disconnecting from the first communication and, at the subsequent time, connecting the second personal agent device and the customer device as nodes on the network to conduct the second communication.

14. The method of claim 8, wherein the first personal agent comprises an identifying attribute of one of a number of agents.

15. A system, comprising:

means to receive a plurality of communications to be routed to a plurality of agent devices, each agent device being utilized by a corresponding agent;

means to collect primary routing information for each of the plurality of communications;

means to, upon determining that the primary routing information for a first communication of the plurality of communications comprises a first personal agent for a customer corresponding to the first communication, determine a first availability of the first personal agent to be connected to the first communication;

means to concurrently maintain the first communication with the customer via a customer device while continually determining whether the first availability is greater than a first threshold;

means to wait until a decision point and, at an occurrence of the decision point means to, upon determining the first availability is greater than the first threshold, collect secondary routing information comprising indicia to disconnect from the first communication and conduct a second communication at a subsequent time; and means to disconnect from the first communication and, at the subsequent time, connect a first personal agent device and the customer device as nodes on a network to conduct the second communication via the network.

16. The system of claim 15, further comprising:

means to collect the secondary routing information further comprising an address of the customer device on the network different from an address of a device utilized during the first communication; and means to connect the first personal agent device with the customer device utilizing the address.

17. The system of claim 15, further comprising means to, at the occurrence of the decision point and upon the first availability not being greater than the first threshold, enqueue the first communication in a queue to connect to the first personal agent device upon the first communication reaching a head of the queue.

18. The system of claim 15, further comprising means to, upon determining the first availability is greater than the first threshold, collect the secondary routing information comprising a second personal agent for the customer and:

upon determining a second availability of the second personal agent to be connected to the first communication is not greater than a second threshold, connect a second personal agent device utilized by the second personal agent to the customer device as nodes on the network to conduct the first communication; and upon determining the second availability is greater than the second threshold, disconnect from the first communication and, at the subsequent time, connect the first personal agent device and the customer device as nodes on the network to conduct the second communication.

19. The system of claim 15, further comprising means to, upon determining the first availability is greater than the first threshold, collect the secondary routing information comprising a second personal agent for the customer and:

upon determining a second availability of the second personal agent to be connected to the first communication is not greater than a second threshold, connect a second personal agent device utilized by the second personal agent to the customer device as nodes on the network to conduct the first communication; and upon determining the second availability is greater than the second threshold, disconnect from the first communication and, at the subsequent time, connect the second personal agent device and the customer device as nodes on the network to conduct the second communication.

20. The system of claim 15, wherein the first personal agent comprises an identifying attribute of one of a number of agents.

* * * * *